United States Patent [19]

Namai

[11] 4,403,844
[45] Sep. 13, 1983

[54] MALFUNCTION PREVENTING DEVICE FOR CAMERA

[75] Inventor: Akihiro Namai, Kawasaki, Japan

[73] Assignee: Canon Kabushiki Kaisha, Tokyo, Japan

[21] Appl. No.: 376,206

[22] Filed: May 7, 1982

[30] Foreign Application Priority Data

May 18, 1981 [JP] Japan .................................. 56-75477
May 18, 1981 [JP] Japan .................................. 56-75478

[51] Int. Cl.³ .......................... G03B 3/00; G03B 9/08
[52] U.S. Cl. .................................. 354/234; 354/25; 354/266
[58] Field of Search ................ 354/25 R, 25 A, 25 P, 354/25 N, 195, 234, 235, 266–268

[56] References Cited

U.S. PATENT DOCUMENTS

4,274,727 6/1981 Nemoto et al. .................. 354/234
4,350,418 9/1982 Taguchi et al. .................. 354/25

Primary Examiner—William B. Perkey
Attorney, Agent, or Firm—Toren, McGeady and Stanger

[57] ABSTRACT

A camera having an electromagnetically operated latch member is provided with a prohibiting member for prohibiting the latch member from being accidentally released before actuation of a camera release, and a control member arranged upon release of the latch member to start an action so that the operation of the camera is controlled, wherein the prohibiting member is arranged to be displaced to a position where the latch member is rendered releasable by the actuation of release and then to be maintained in this position by the control member.

14 Claims, 7 Drawing Figures

MALFUNCTION PREVENTING DEVICE FOR CAMERA

BACKGROUND OF THE INVENTION

1. Field of the Invention

This invention relates to cameras in which an operation of the automatic focus adjusting mechanism or the shutter mechanism is initiated by an electromagnet, and more particularly to a malfunction preventing device for such cameras operating in such a manner that no malfunction occurs as accidental actuation of a camera release is prevented.

2. Description of the Prior Art

It has been known in the art to provide a camera in which the shutter mechanism after having been charged in response to a film winding operation and held in the charged position by engaging with a latch member is made to start action when the latch member is taken out of engagement by the attractive force of an electromagnet. Such a device is, for example, disclosed in U.S. Pat. No. 3,722,392 (issued Mar. 27, 1973).

In such cameras, the capacity of the battery which the camera housing can accommodate cannot be very much increased. This applies to the camera of U.S. Pat. No. 3,722,392 too so that it is impossible to achieve a much-desired increase in the intensity of current supplied to the electromagnet and, therefore, to provide a duly large attractive force thereat. As a result, in the case of such camera, it is required that the force necessary to take the latch member out of engagement with the shutter mechanism in the charged position be very small.

However, if so, there will be a high possibility of accidentally releasing the latch member from engagement when the camera receives a shock from the outside (for example, by a force acting thereon when the camera is roughly placed onto a hard surface, or dropped), thus permitting the shutter mechanism to malfunction. Accordingly, such a camera is very susceptible to impulses and encounters a problem from the point of view of practical use.

For this reason, according to the prior art, as disclosed in the above-cited U.S. Pat. No. 3,722,392, means is provided for prohibiting action of the latch member before the actuation of a camera release, and this means is arranged to cooperate with the release actuator in such a manner that the latch member can be moved only after the actuation of camera release, thus preventing a malfunction from occurring before the intentional actuation of the camera release.

However, this conventional method has a disadvantage in that after the release actuator is once operated to initiate an operation of the camera, when the operation of the release actuator is interrupted, it results that despite the camera being under exposure operation, the aforesaid means is actuated again to hinder the action of the latch member so that the exposure operation is stopped from proceeding further. In other words, such a camera is incapable of making a correct exposure when the release actuator is depressed for a moment, and of operation with the use of a self-timer. Also upon consideration of recently developed cameras which generally have automatic focus adjusting devices (hereinafter referred to as "AF"device), even in such cameras, a similar problem arises when the AF device is made to start operating by the attractive force of the electromagnet.

SUMMARY OF THE INVENTION

With the foregoing in mind, it is an object of the present invention to provide for a camera having an electromagnetically operated latch member with a malfunction preventing device making it possible to assure prevention of a faulty operation of the camera before camera release is actuated, and to allow for the exposure operation of the camera not to be hindered after the actuation of camera release.

Another object of the invention is to provide a malfunction preventing device for a camera capable of preventing accidental actuation of camera release with very high reliability, while still permitting camera operating beginning with the release actuation through the completion of a correct exposure to terminate at the charging of the camera in the initial state.

Still another object of the invention is to provide a malfunction preventing device suited for use in a camera of the type in which an automatic focus adjusting mechanism and a shutter mechanism are controlled by a common electromagnet.

These and other objects of the invention will become apparent from the following description of an embodiment thereof taken in connection with the accompanying drawings.

DETAILED DESCRIPTION OF THE PREFERRED EMBODIMENT

Figure 1:
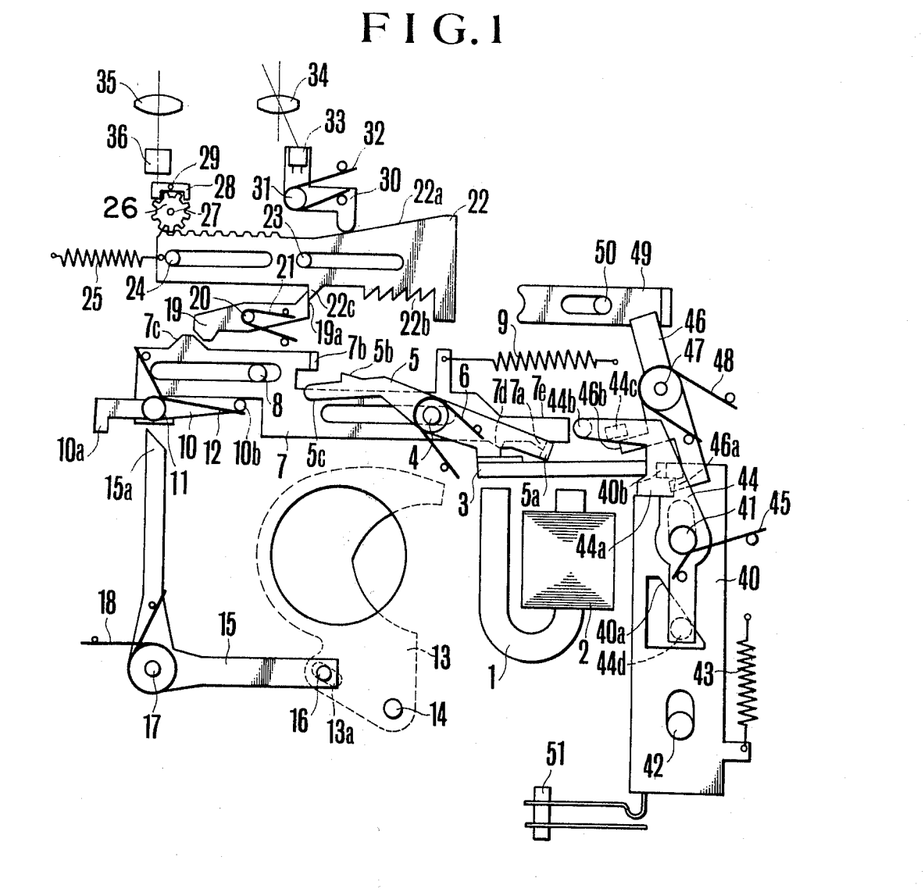
FIG. 1 is an elevational view of an embodiment of a malfunction preventing device according to the present invention applied to a camera of the type described.

The present invention will next be described in connection with the illustrated embodiment in greater detail. It is now noted that FIG. 1 illustrates the camera having an automatic focus adjusting mechanism and a shutter mechanism which are coordinated by an electromagnetically operated control member, and that the malfunction preventing device of the invention is very suited for use in such camera.

In the drawings, a magent yoke 1 is fixed to a shutter base plate (not shown) and is associated with a solenoid 2 for producing a magnetic field when current is supplied thereto from a battery (not shown). An armature 3 is arranged in confronting and slightly spaced relation to and from the tip of the yoke 1. This armature 3 is attracted to the magnet yoke when the solenoid 2 is energized. Formed as a unit with the armature 3 and pivotally mounted at a shaft 4 fixed to the shutter base plate in a latch lever 5. This latch lever 5 is turned in a clockwise direction when the armature 3 is attracted. A spring 6 urges the latch lever 5 in a counter-clockwise direction. Next, 7 is a coordination control member in the form of a slide plate slidingly movable to the right as viewed in FIG. 1 guided by the pivot pin 4 and an additional pin 8 similarly fixed to the shutter base plate. A spring 9 urges the slide plate 7 in that direction. This slide plate 7 is provided with a first lug 7a arranged to engage a pawl 5a formed in the armature-side end portion of the latch lever 5 when the camera is set in the initial position, a second lug 7d arranged near the first lug 7a to engage the pawl 5a when the armature 3 is released from the first attraction by the magnet yoke 1, and a third lug 7b arranged on the opposite side edge to oppose a second pawl 5b of the latch lever 5 when a first attraction of the armature 3 by the magnet yoke 1 occurs. Therefore, the slide plate 7 is moved stepwise to the right as the cycle of energization and de-energization of the solenoid 2 repeats itself.

Next, 10 is an actuator lever mounted at a pivot pin 11 which is arranged on the slide plate 7 and urged by a spring 12 in a counter-clockwise direction. The actuator lever 10 has a hook 10a formed in one end portion thereof to engage a free end of a shutter control lever 15 when the stepwise moved slide plate 7 reaches the final step, and it has a pin 10b arranged on the opposite end thereof for the purpose of releasing this engagement as a tail 5c of the latch lever 5 strikes the pin 10b and turns the actuator lever 10 in a clockwise direction. Two shutter blades 13, one of which is not shown for the purpose of clarity, are pivotally mounted on a common pin 14 which is fixed to the shutter base plate and move symmetrically with respect to the diametrical line of an exposure aperture. The shutter blade 13 is provided with an elongated slot 13a in which is engaged a pin 16 on the shutter control lever 15 so that motion of the lever 15 is transmitted to the shutter blades 13. A spring 18 urges the shutter control lever 15 to turn about a pivot pin 17 fixed to the shutter base plate in a counter-clockwise direction.

Next, the AF mechanism includes a latch lever 19 mounted at a pivot pin 20 which is fixed to the shutter base plate (not shown), and urged by a spring 21 in a counter-clockwise direction. This latch lever 19 has a hook 19a arranged to engage an automatic focus adjustment control plate 22 (hereinafter described as "AF" control plate) at a first tooth 22c when the camera is set in the initial position. Then when the slide plate 7 moves one step from the initial position, a lobe 7c lifts the tail of the latch lever 19, whereby the hook 19a is disengaged from the tooth 22c.

The AF control plate 22 is guided by pins 23 and 24 fixed to the shutter base plate (not shown) and urged by a spring 25 leftwards as viewed in the drawings. Further provided in the upper edge of the AF control plate 22 is a racked portion meshing with a crown gear 26 rotatably mounted on a shaft 27 and cooperating with a swinging anchor 28 which is movably mounted on a shaft 29 to regulate the rotation of the crown gear 26. With this, after the hook 19 is disengaged from the first tooth 22c, the AF control plate 22 is moved to the left at a constant speed. When an in-focus condition is detected by means (not shown), the hook 19a is brought into engagement with one of the teeth 22b in the lower edge of the plate 22.

Next, a light projecting element carrier or lever 30 is mounted at a pivot pin 31 fixed to a camera housing (not shown) and urged by a spring 32 in a clockwise direction. One end of the lever 30 is in contact on a camming surface 22a of the AF control plate 22, the opposite end of which fixedly carries a light-emitting element 33. There are also a projection lens 34, a collection lens 35 and a light-sensitive element 36 which are all fixed to the camera housing. These parts constitute an active type automatic focus detecting device of known construction. A more detailed explanation concerning this portion of the camera is not given here since Japanese Patent Application Sho 53-48006 (corresponding to U.S. patent application Ser. No. 265,806, filed May 21, 1981, which is a continuation of U.S. patent application Ser. No. 32,791 filed Apr. 17, 1979) of the present applicant describes it in greater detail.

It is also noted that a focusing control mechanism for a photographic objective (not shown) is operatively connected to the AF control plate 22 through an intermediary of known construction.

Figure 7:
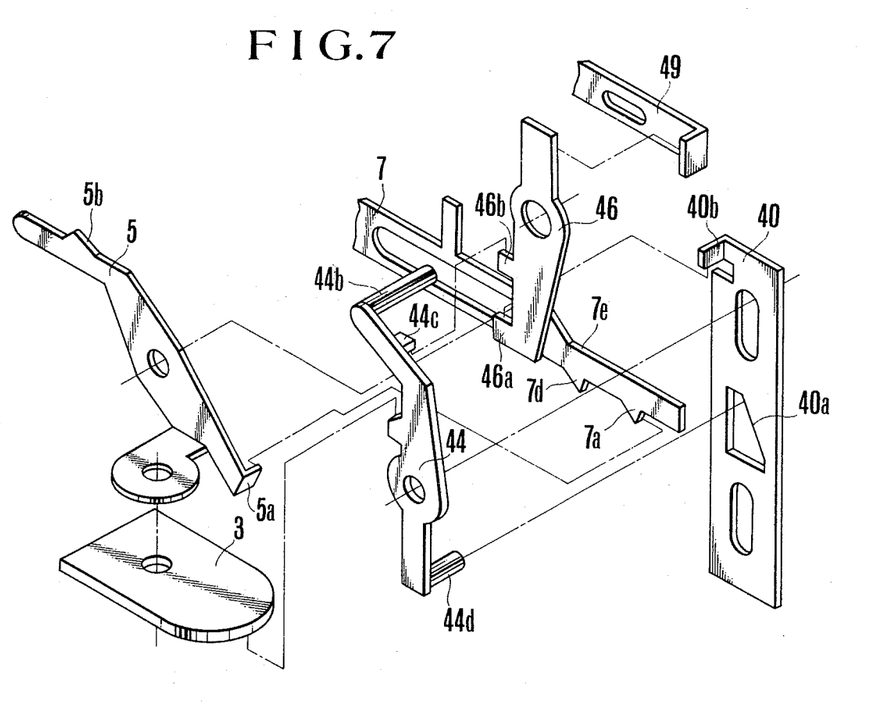
FIG. 7 is an exploded perspective view of the main parts of the device of FIG. 1.

Next, referring to FIGS. 1 and 7, 40 is a release plate slidingly movable and guided by pins 41 and 42 and cooperating with a shutter button (not shown). A spring 43 urges the release plate 40 upwards as viewed in the drawings. When the shutter button is pushed down, a release switch 51 is turned on by the bottom end of the release plate 40. A lock lever 44 is pivotally mounted on the pin 41 and is urged by a spring 45 in a counter-clockwise direction. This lock lever 44 has an extension 44a arranged upon setting of the camera in the position of FIG. 1, or before initiation of a camera operation to engage with the end of the armature 3 so that the latch lever 5 is prohibited from being disengaged from the control plate 7 when a shock is imparted to the camera. A pin 44b is mounted on one end of the lock lever 44 and arranged upon sliding movement of the control plate 7 to ride on an upper edge 7e thereof. Also this lock lever 44 is turned in a clockwise direction when the release plate 40 moves downwards, whereby the extension 44a is taken out of engagement with the armature 3. For this purpose, another pin 44d is arranged on the opposite end of the lock lever 44 and slidingly moves on a camming surface 40a provided in the release plate 40. A release lock lever 46 mounted at a pivot pin 47, is urged by a spring 48 in a clockwise direction, and has a first lug 46a for engagement with a bent portion 40b of the release plate 40 and a second lug 46b for engagement with a bent portion 44c of the lock lever 44. There is also another slide plate 49 movable and guided by a pin 50 and cooperating with a charging mechanism (not shown) in such a manner that when the camera is in the ready-to-shoot position of FIG. 1, the release lock lever 46 is held in the illustrated position, and when the exposure operation of the camera is terminated, the slide plate 49 is moved to the right while turning the release lock lever 46 in a clockwise direction.

It is noted that the slide plate 49 is arranged to move to the right in response to closing operation of the shutter blades 13 and then to return to the position of FIG. 1 in response to charging operation of the camera. Such an arrangement is similar to that described in connection with the technique disclosed in a Japanese patent application Sho 53-113048 (corresponding to U.S. patent application Ser. No. 74,313 filed Sept. 11, 1979 now U.S. Pat. No. 4,350,418 of Sept. 21, 1982) by the applicant of the present application. For this reason, a more detailed explanation is not provided.

FIG. 1 illustrates the position which results from charging of the camera to the exposure-ready condition. In this drawing, the extension 44a of the lock lever 44 engages the armature 3 so that even when a shock is experienced by the camera, the latch lever 5 never turns against the bias force of the spring 6 and the control plate 7 controlling the actuating of the AF control plate 22 and shutter control lever 15 never starts to move. Then when the shutter button is depressed, the release plate 40 is moved downwards, while the pin 44d is noved by the camming surface 40a of the release plate 40, whereby the extension 44a of the lock lever 44 is disengaged from the armature 3 to permit movement of the armature 3. Also, just after this, the release plate 40 turns on the switch 51 to supply the solenoid 2 with current from a control circuit (not shown), whereby the armature 3 is attracted to the magnet yoke 1. It is noted that after the aforesaid control circuit has once been rendered operative, it is maintained in ON position until the operation ends regardless of the removal of the operator's finger from the shutter button.

Figure 2:
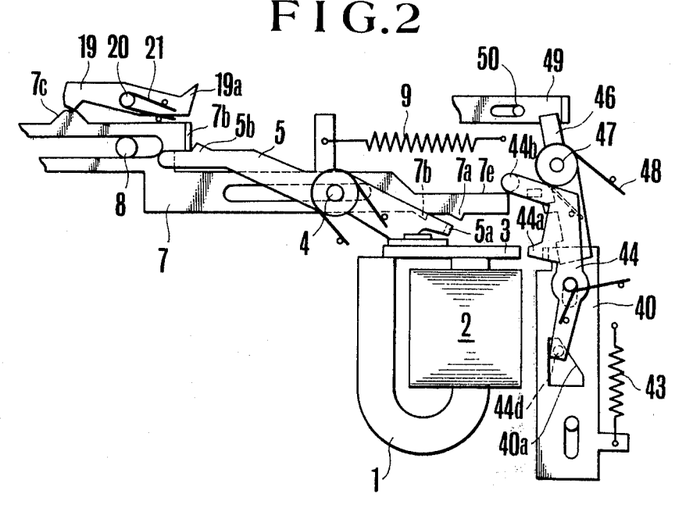
FIG. 2 is a similar view of the device in a position where an AF operation is initiated.

As the armature 3 is attracted to the magnet yoke 1, the latch lever 5 that is formed in unison with the armature 3 turns about the shaft 4, whereby its bent portion or pawl 5a is disengaged from the first lug 7a of the coordination control plate 7. Therefore, the plate 7 starts to move to the right as viewed in the drawings under the action of the spring 9. Then, this movement of the control plate 7 is stopped by the extension 5b of the latch lever 5 engaging the second lug 7b of the control plate 7. Such movement of the control plate 7 causes the lock lever 44 to be held in the advanced position by the upper edge of the plate 7 bearing the pin 44b of the lock lever 44. For this reason, even when this is soon followed by the return of the release plate 40 to the initial position, there is no possibility of occurrence of interference of the extension 44a with the armature 3 and therefore the camera operation is never interrupted. This state is illustrated in FIG. 2.

Figure 3:
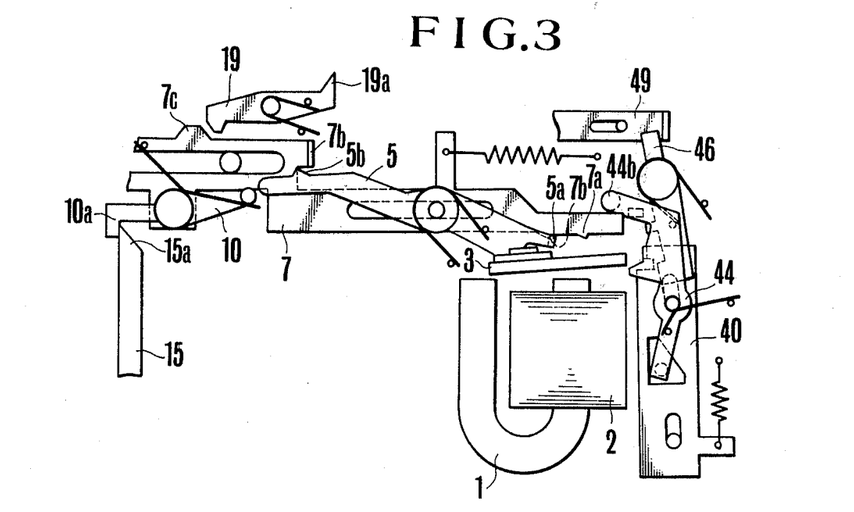
FIG. 3 is a similar view of the device in a position where the AF operation is terminated.

In the first step of movement of the coordination control plate 7, the AF latch lever 19 is turned about the pivot shaft 20 in the clockwise direction against the bias force of the spring 21 by the lobe 7c lifting up the tail of the AF latch lever 19. Therefore, the hook 19a of the latch lever 19 is disengaged from the first tooth 22c of the AF control plate 22, permitting the AF control plate 22 to start moving to the left under the action of the spring 25, while the speed of movement is adjusted to a predetermined value by the governer of the crown gear 26 and anchor 28. As this AF control plate 22 moves, the lever 30 with the light-emitting element 33 is turned about the pivot pin 31 in a counter-clockwise direction, while scanning the target area to find a range. Then, when the automatic focus adjusting mechanism detects an in-focus condition, the current supply to the solenoid 2 from the control circuit (not shown) is cut off. Since, at this time, the attractive force of the magnet yoke 1 to the armature 3 disappears, the latch lever 5 is turned in the counter-clockwise direction by the bias force of the spring 6, whereby the second pawl 5b is disengaged from the secod lug 7b of the coordination control plate 7. Then the plate 7 moves again to the right under the action of the spring 9 until the third lug 7d of the plate engages the first pawl 5a of the latch lever 5 as illustrated in FIG. 3. Such movement of the coordination control plate 7 causes the lobe 7c to move away from the tail of the AF latch lever 19 and therefore the AF latch lever 19 to turn about the pivot pin 20 in the counter-clockwise direction under the action of the spring 21, whereby the AF control plate 22 is arrested by the hook 19a engaging one of the teeth 22b. Thus, the focusing of the objective lens (not shown) is completed.

Figure 4:
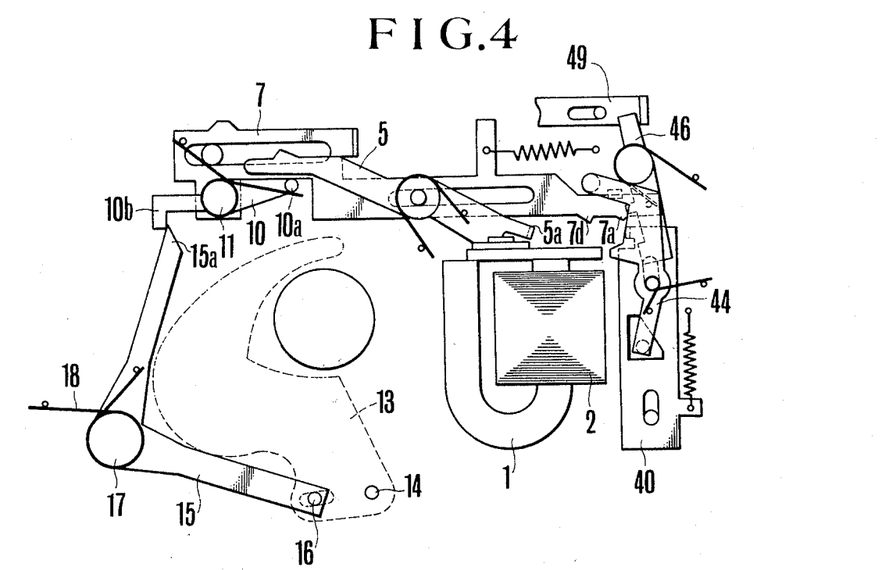
FIG. 4 is a similar view of the device in a position where an exposure operation is initiated.

After that, the solenoid 2 is energized again by the control circuit (not shown) and the armature 3 is attracted again to disengage the first pawl 5a of the latch lever from the third lug 7d of the coordination control plate 7, permitting the plate 7 to start a second step of movement to the right as viewed in the drawings. Also, since, at this time, the actuator lever hook 10a on the rear end of the plate 7 is just in contact with the top end 15a of the shutter control lever 15, it results that as the plate 7 moves, the shutter control lever is turned in the counter-clockwise direction, while turning the shutter blades 13 about the pivot pin 14 in opposite directions to each other, thus initiating an exposure. This position is illustrated in FIG. 4.

Figure 5:
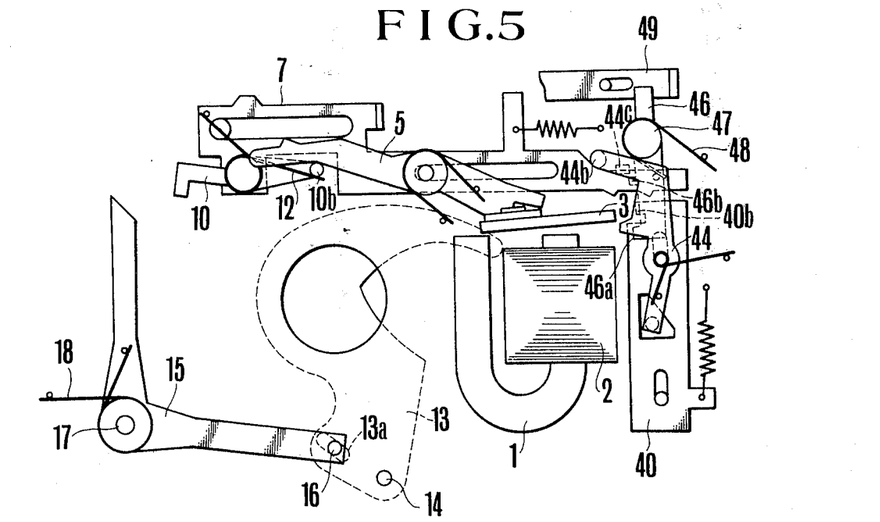
FIG. 5 is a similar view of the device in a position where the exposure operation is terminated.

And, after that, when an exposure control circuit detects an attainment of the amount of exposure to a computed value, the current supply to the solenoid 2 is cut off. Therefore, the attractive force of the magnet yoke 1 to the armature 3 is lost, permitting the latch lever 5 to turn in the counter-clockwise direction under the action of the spring 6. At this time, the tail 5c of the latch lever 5 strikes the pin 10b on the actuator lever 10 and disengages the hook 10a from the top end 15a of the shutter control lever 15 as illustrated in FIG. 5. As a result, the shutter control lever 15 is turned in the counter-clockwise direction under the action of the spring 18, thus closing the shutter blades 13. By this time, a series of operations, namely, automatic focusing operation and shutter opening and closing operation are terminated, and the shooting operation of the camera is completed.

Figure 6:
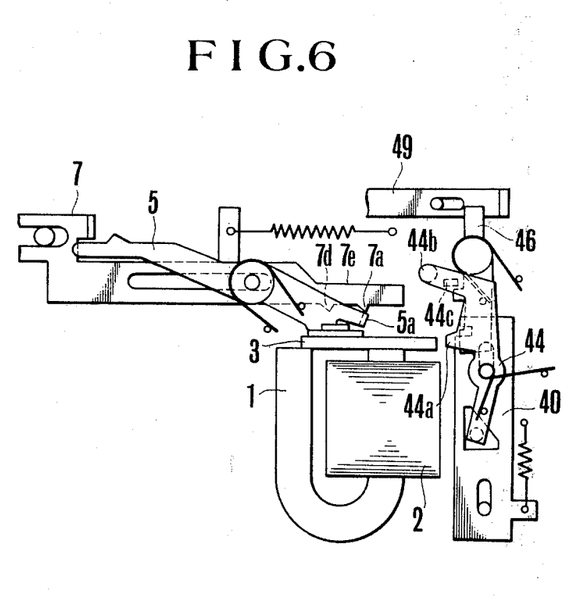
FIG. 6 is a similar view of the device in a re-charged position.

It should be pointed out here that responsive to the completion of the shooting operation, the slide plate 49 moves to the right in the position of FIG. 5, causing the release lock lever 46 to turn in the clockwise direction by the action of the spring 48. Suppose that, at this time, the release plate 40 is in the initial position, that is, does not continue being depressed, the extension 46a abuts against the bent portion 40b of the release plate 40. With this, even when the shutter button is pushed down again, the downward movement of the release plate 40 which would otherwise result does not occur and therefore the switch 51 cannot be closed again accidentally. It should also be pointed out that such pivoting movement of the release lock lever 46 brings another extension 46b into abutting engagement against the bent portion 44c of the lock lever 44. As illustrated in FIG. 6, therefore, during the time when the charging mechanism returns the coordination control plate 7 to the ready-to-shoot position after the completion of the shooting operation, the lock lever 44 is held in the illustrated position despite the upper edge 7e is moved away from the pin 44b of the lock lever 44. Because of this, as the first pawl 5a of the latch lever 5 allows for the lugs 7a and 7d of the coordination control plate 7 to pass over when it returns to the initial position, the otherwise resulting interference between the armature 3 and the locking portion 44a is not encountered. Therefore, there is no possibility of hindering the coordinating control plate 7 from being reset.

The slide plate 49 returns to the position of FIG. 1 in automatic response to resetting of the camera to the ready-to-shoot position by the charging mechanism (not shown). At this time, the release lock lever 46 is caused to turn in the counter-clockwise direction. Then, the bent portion 40b of the release plate 40 is disengaged from the extension 46a, whereby the release plate 40 is rendered releasable again. Such movement of the release lock lever 46 also causes counter-clockwise movement of the lock lever with its locking portion 44a being brought into engagement with armature 3, thus restricting the actuation of the latch lever 5. Now the camera resumes the portion of FIG. 1 and is made ready for another exposure.

As has been described in greater detail above, the present invention is intended to provide a camera having an electromagnetically releasable latch member with a prohibiting member in the form of the lock lever for prohibiting undesired actuation of the aforesaid latch member when no exposure is intended, the arrangement of said prohibiting member being such that during an exposure operation the latch member is allowed to operate freely, thereby making it possible to prevent an accidental actuation of the AF mechanism and of the shutter mechanism when a shock is imparted to the camera. The system operates with high reliability and also prevents a malfunction that might occur if the latch member were inhibited from effecting its functions at a time during camera operation whereby the camera would no longer be able to operate. Therefore, the present invention produces advantages in that even when the release button is pushed down for a moment, or when an exposure is to be made with the use of a self-timer, the camera operation goes on with high accuracy and reliability of coordination control and the capabilities of such camera can be broadened.

Also according to the present invention, the coordination control member whose operation is controlled by the latch member to coordinate the various portions of the camera is used in holding the aforesaid prohibiting member in the idle position. Therefore, there is no need to provide a special holding mechanism, thereby giving additional advantages in that the malfunction preventing device can be constructed in a very simple form, while still providing high assurance that the prohibiting member will be set aside after the actuation of a camera release. Thus, accuracy and reliability of coordination control for various portions of such camera can be significantly improved.

Further, according to the present invention, even when the aforesaid coordination control member is re-charged to the ready-to-shoot position, the aforesaid prohibiting member continues being held in the idle position, permitting an action of the latch member with the result that when a film winding operation is being performed, the aforesaid coordination control member can be charged without causing any mechanical interference to occur.

Though the foregoing embodiment of the invention has been described as applied to the type of camera in which the operation of the AF mechanism and shutter mechanism is controlled by one elecgromagnet, it is to be understood that the present invention is not confined thereto. The present invention is applicable to another type of camera in which the AF and shutter mechanisms are provided with respective individual electromagnets as well. And, in this case, it is easy to use the malfunction preventing device of the invention in each of the AF and shutter mechanisms.

Also in the illustrated emgodiment of the invention, use is made of an arrangement of the latch member so that it will be taken out of the latching connection by the attraction of the energized electromagnet. In this connection a variation may be provided using a permanent magnet associated with the solenoid to form a release type electromagnet, such that when the solenoid is unenergized, the latch member is attracted to effect latching connection, and when the solenoid is supplied with current flowing in a direction to cancel the magnetic force of the permanent magnet, this latch member is actuated. and taken out of the latching connection.

While a specific embodiment of the invention has been shown and described in detail to illustrate the application of the inventive principles, it will be understood that the invention may be embodied otherwise without departing from such principles.

What is claimed is:

1. A malfunction preventing device for a camera comprising:
    (a) an electromagnet;
    (b) control means for controlling the operation of said camera;
    (c) latching means for engagement with said control means, said latching means when actuated by said electromagnet releasing said engagement to permit said control means to move; and
    (d) prohibiting means for prohibiting said latching means from operating before actuation of a camera release, said prohibiting means being responsive to actuation of the camera release for rendering said latching means operative and, after an initiation of an operation of said control means, having its position maintained by said control means.

2. A device according to claim 1, wherein said control means controls an automatic focus adjusting mechanism of said camera.

3. A device according to claim 1, wherein said control means controls a shutter mechanism of said camera.

4. A device according to claim 1, wherein said control means operates to control an automatic focus adjusting mechanism of said camera and thereafter operates to control a shutter mechanism of said camera.

5. A device according to claim 4, wherein said control means is urged in a certain direction, and upon release from the engagement with said labeling means in its urging direction.

6. A device according to claim 5, wherein said electromagnet operates to twice attract said latching means and to release it twice.

7. A device according to claim 6, wherein said control means has a first lug arranged to engage said latching means before actuation of a camera release, a second lug arranged to engage said latching means when said electromagnet effects a first attraction operation, and a third lug arranged to engage said latching means when said electromagnet effects a first release operation.

8. A malfunction preventing device for a camera comprising:
    (a) an electromagnet;
    (b) control means movable in a stepwise manner to control the operation of said camera, said control means being urged in a certain direction;
    (c) latching means for engagement with said control means, said latching means when actuated by said electromagnet releasing said engagement to permit movement of said control means; and
    (d) prohibiting means engaging said latch means before actuation of a camera release, said prohibiting means responsive to actuation of the camera release for releasing the engagement with said latching means and engaging said control means in such a manner that said engagement is released.

9. A device according to claim 8, wherein said control means engages said prohibiting means in different positions as said control means moves.

10. A malfunction preventing device for a camera comprising:
   (a) an electromagnet;
   (b) control means for controlling the operation of said camera;
   (c) latching means for engagement with said control means, said latching means when actuated by said electromagnet releasing said engagement to permit movement of said control means;
   (d) prohibiting means for prohibiting said latching means to operate before actuation of a camera release, said prohibiting means being responsive to actuation of the camera release for rendering said latching means operative and, after an initiation of an operation of said control means, having its position maintained by said control means; and
   (e) holding means for holding said prohibiting means in a position where said latching means is operable when said control means is charged to the initial position, said holding means holding said latching means until the completion of the charging.

11. A device according to claim 10, wherein said holding means while holding said latching means hinders a camera release from being actuated.

12. A device according to claim 11, wherein said control means controls an automatic focus adjusting mechanism of said camera.

13. A device according to claim 11, wherein said control means controls a shutter mechanism of said camera.

14. A device according to claim 11, wherein said control means operates to control an automatic focus adjusting mechanism of said camera and thereafter operates to control a shutter mechanism of said camera.

* * * * *